(12) United States Patent
Summer

(10) Patent No.: US 6,982,883 B2
(45) Date of Patent: Jan. 3, 2006

(54) RADIATION TOLERANT ELECTRICAL COMPONENT WITH NON-RADIATION HARDENED FET

(76) Inventor: Steven E. Summer, 1 Roned Rd., Shirley, NY (US) 11967

(*) Notice: Subject to any disclaimer, the term of this patent is extended or adjusted under 35 U.S.C. 154(b) by 0 days.

(21) Appl. No.: 10/806,872

(22) Filed: Mar. 22, 2004

(65) Prior Publication Data

US 2005/0207186 A1    Sep. 22, 2005

(51) Int. Cl.
*H02M 3/335*    (2006.01)

(52) U.S. Cl. .................. 363/21.12; 363/21.15; 363/21.18

(58) Field of Classification Search ............. 363/21.01, 363/21.12, 21.15, 21.13, 21.18, 21.17
See application file for complete search history.

(56) References Cited

U.S. PATENT DOCUMENTS

| | | | |
|---|---|---|---|
| 3,836,836 A | 9/1974 | Cowett, Jr. | |
| 4,559,590 A | 12/1985 | Davidson | |
| 4,645,998 A | 2/1987 | Shinohara et al. | |
| 4,928,220 A | 5/1990 | White | |
| 5,315,230 A | 5/1994 | Cordoba et al. | |
| 5,499,183 A | 3/1996 | Kobatake | |
| 5,661,642 A * | 8/1997 | Shimashita | 363/21.15 |
| 5,757,627 A * | 5/1998 | Faulk | 363/21.14 |
| 5,870,296 A | 2/1999 | Schaffer | |
| 6,025,705 A | 2/2000 | Nguyen et al. | |
| 6,452,818 B1 * | 9/2002 | Simopoulos | 363/21.06 |
| 6,456,511 B1 * | 9/2002 | Wong | 363/21.13 |
| 6,473,317 B1 | 9/2002 | Simopoulos | |
| 6,519,165 B2 | 2/2003 | Koike | |
| 6,778,411 B2 * | 8/2004 | Huang | 363/49 |
| 2001/0030879 A1 | 10/2001 | Greenfield et al. | |

* cited by examiner

*Primary Examiner*—Bao Q. Vu
(74) *Attorney, Agent, or Firm*—Stephen E. Feldman, PC

(57) ABSTRACT

A radiation tolerant electrical component is provided without a radiation hardened material FET. A p-channel MOSFET provides switching capabilities in radiated environments because its gate voltage starts at a negative value and becomes more negative with exposure to radiation. Therefore, the gate is still controllable when exposed to radiation.

21 Claims, 2 Drawing Sheets

RADIATION TOLERANT ELECTRICAL COMPONENT WITH NON-RADIATION HARDENED FET

FIELD OF THE INVENTION

The present invention deals with DC/DC converters and more specifically, radiation tolerant DC/DC converters.

BACKGROUND OF THE INVENTION

DC/DC converters are electronic devices that use switching components, such as field effect transistors (FETs) to transform voltage from one level to another. Typically, the output voltage is regulated and protected against short circuits. In many cases, the input and output potentials are galvanically isolated from each other.

In an FET, current flows along a semiconductor path called the channel. At one end of the channel, there is a source electrode, and at the other end, a drain electrode. The physical diameter of the channel is fixed, but its effective electrical diameter is changed by applying voltage to a gate electrode. The conductivity of the FET depends, at any given time, on the electrical diameter of the channel. A small change in gate voltage can cause a large variation in current from the source to the drain. In this way, the FET switches current on or off.

Typically, FETs used for power switching are enhancement mode types, that is, they are normally non-conducting. When a gate voltage above a certain threshold is applied, the FET becomes conducting. Such FETs are used to control current flow and are available in two gate polarities; N channel and P channel.

Among many applications, DC/DC converters are used in spacecraft, satellites and in high energy physics instrumentation where they are subjected to many forms of radiation damage. When electrical components are exposed to radiation, they behave differently. For example, when an N channel FET is exposed to relatively low radiation levels, the gate threshold voltage ultimately falls close to zero. In this condition, the FET conducts current with little or no applied gate voltage. In other words, the FET is uncontrollable because the current running through the channel cannot be shut off.

DC/DC converters designed for general purpose use are typically constructed with N channel FETs because, for any given die size transistor, the N channel FET has a lower on resistance than a correspondingly sized P channel FET.

To use electrical components in high radiation environments, they are radiation-hardened to withstand the damage caused by radiation. The radiation hardening process usually involves removing or adding some specific element or ions to the materials used for making the components. Being radiation hardened, the gate threshold voltage experiences minimal change after exposure to radiation. One method for chemically radiation hardening DC/DC converters is disclosed in U.S. Pat. No. 3,836,836 to Cowett, Jr. (Cowett).

Radiation hardened components, however, have limited sources, are expensive and take a long time to produce, creating higher prices and longer delivery times for the radiation tolerant DC/DC converters that incorporate the hardened materials. It is desireable, therefore, to provide electrical components with ordinary (non-hardened) materials that can function when exposed to radiation.

SUMMARY OF THE INVENTION

A radiation tolerant electrical component for providing controlled electrical response in a radiated environment is provided with an ordinary, non-hardened FET. The component comprises an input line, an output line, a drive circuit, a p-channel FET having a drain, a gate, and a source, an isolation circuit, and an output rectification circuit. The gate drive voltage for the FET is negative and when exposed to radiation, becomes more negative, so the FET is controllable while it operates below its maximum gate voltage signal, even when exposed to radiation.

The input line is operably connected to the drive circuit, the drive circuit is operably connected to the gate, the source and gate are operably connected to the output rectification circuit, and the output rectification circuit is operably connected to the output line. The isolation circuit is operably connected between the output line and the drive circuit to isolate the input line from the output line; and the drain is connected at or near ground potential.

DETAILED DESCRIPTION

Figure 1:
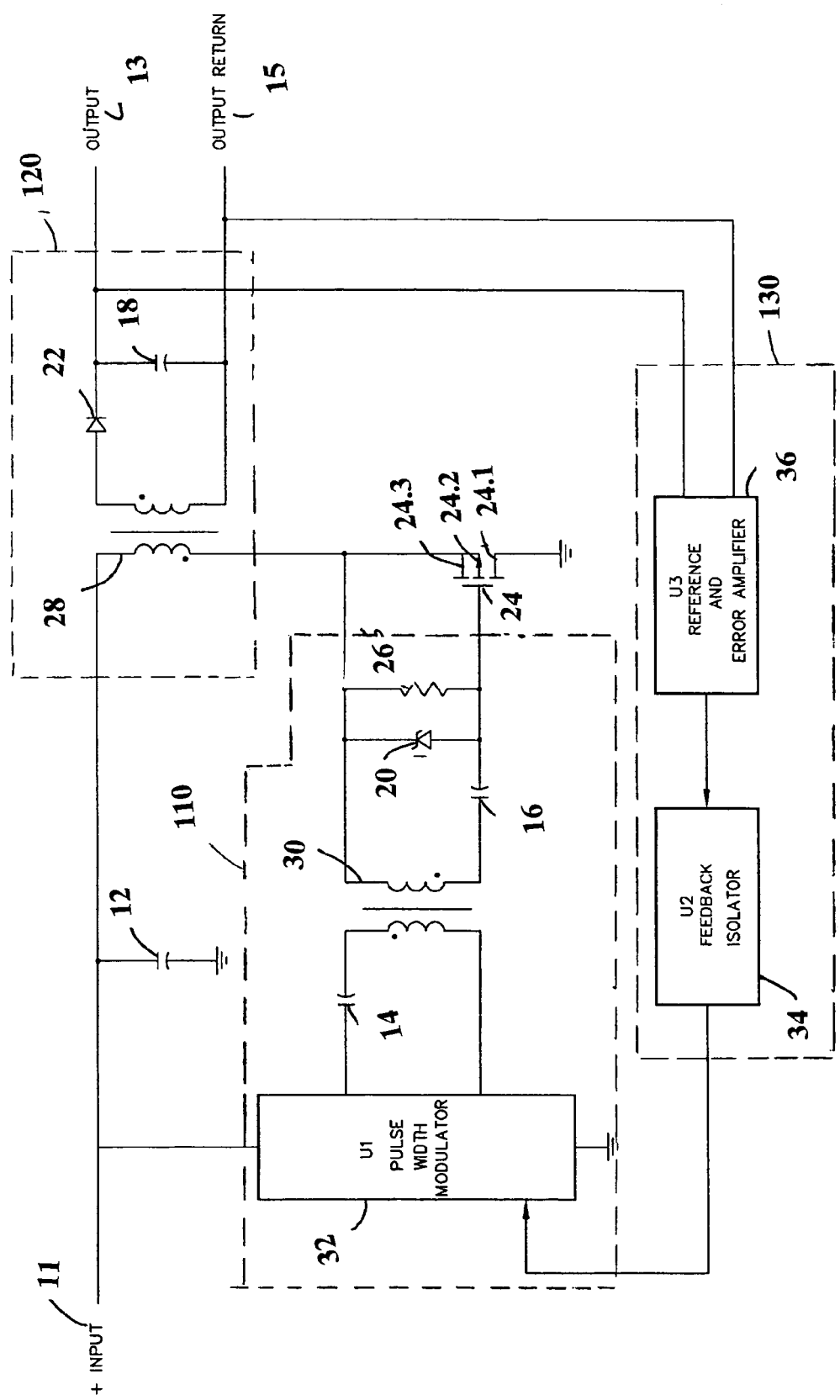
FIG. 1 is a circuit diagram for an exemplary radiation tolerant DC/DC converter according to an embodiment of the present invention.

Field-effect transistors exist in two major classifications, the junction FET (JFET) and the metal-oxide-semiconductor FET (MOSFET). A MOSFET is a special type of FET that works by electronically varying the width of a channel along which charge carriers (electrons or holes) flow. Wider channels provide better conductivity. The charge carriers enter the channel at the source, and exit via the drain. The width of the channel is controlled by the voltage on an electrode called the gate, which is located physically between the source and the drain and is insulated from the channel by an extremely thin layer of metal oxide.

There are two ways in which a MOSFET can function. The first is known as depletion mode. When there is no voltage on the gate, the channel exhibits its maximum conductance. As the voltage on the gate increases (either positively or negatively, depending on whether the channel is made of P-type or N-type semiconductor material), the channel conductivity decreases. The second mode of MOSFET operation is called enhancement mode. When there is no voltage on the gate, there is in effect no channel, and the device does not conduct. A channel is produced by the application of a voltage to the gate. Increasing gate voltage increases conductivity and thus, current flow.

The MOSFET has certain advantages over the conventional junction FET, or JFET because the gate is insulated electrically from the channel. No current flows between the gate and the channel, regardless of the gate voltage (as long as it does not become so great that it causes physical breakdown of the metallic oxide layer). Thus, the MOSFET has practically infinite impedance.

In this type of application, namely a DC/DC power converter, the salient characteristics of the semiconductor switch are its off voltage withstanding capability (the drain to source voltage) and its on resistance (which should be as low as possible). MOSFETS are used over JFETS because MOSFETS have much better drain to source voltage and on resistance characteristics.

When conventional non-radiation hardened N Channels FETs are used in applications where radiation is present, the FETs become uncontrollable at relatively low radiation levels because the gate threshold voltage of the N channel FET experiences a negative shift and ultimately falls close to zero. At that point, the N channel FET conducts current with little or no gate voltage applied making it uncontrollable, like a flood gate that cannot be closed.

The gate threshold voltage of a conventional, non-radiation hardened P channel FET also shifts negatively with radiation exposure. However, the initial threshold voltage of an ordinary P channel FET is negative to begin with. In the presence of radiation, therefore, the gate threshold voltage does not approach zero and therefore will not become uncontrollable. The gate threshold voltage does change, but from a negative value to a more negative value. Conventional P channel FETs, therefore, are more robust to total radiation dose effects as compared to conventional N channel FETs when the proper gate drive signal is provided.

In accordance with an embodiment of the present invention, the gate drive signal should be high enough to saturate the drain to source channel. It should not, however, be so high that the gate to source breakdown voltage rating of the FET is exceeded. Preferably, the FET operates close to its maximum gate voltage signal because higher signals can handle higher radiation levels, and therefore, the FET functions across a larger range of radiation exposure.

FIG. 1 shows a circuit diagram for a DC/DC converter in accordance with a preferred embodiment of the present invention. An input line 11 provides an input signal to a drive circuit 110 that drives an FET 24 to produce an output. The FET output is run through a rectification circuit 120 before being supplied on an output line 13 and output return 15. An isolation circuit 130 isolates the input 11 from the output 13 and 15.

The FET 24, preferably a p-channel MOSFET, has its drain terminal 24.1 connected at or near the ground potential. The gate 24.2 and source 24.3 terminals are switched so that the drain 24.1 acts as an electrostatic shield, reducing current flow into the metal case that houses the converter, thereby minimizing unwanted electromagnetic emissions from the DC/DC converter.

In the drive circuit 110, a drive pulse transformer 30 inverts the polarity of the drive signal and transmits a negative gate drive signal to the MOSFET 24. The transformer also provides electrical isolation, allowing use of a standard integrated circuit (IC) 34 to provide the drive signal.

The transformer 30 primary winding is connected to the drive circuit 32, a standard pulse width modulator IC in this case. A primary blocking capacitor 14 connected between the modulator 32 and the transformer 30 on the primary winding prevents DC current from flowing into the primary winding of the transformer 30. A secondary blocking capacitor 16 blocks the DC voltage component from appearing across the secondary winding of the transformer 30. The pulse width modulator IC 32 generates the drive pulses that drive a switching duty cycle in the MOSFET 24 to produce the desired overall output voltage from the flyback circuit [which is the flyback circuit?].

On the secondary side of the transformer 30, the secondary blocking capacitor 16 and a shunt diode 20 restore the DC component of the drive pulse. The shunt diode 20 may be a zener diode. Use of a zener diode permits transient voltages from appearing on the FET gate 24.2. The zener diode 20 combines the functions of a DC restorer and prevents the voltage on the gate of the FET 24 from exceeding a safe magnitude. A bleeder resistor 26 may be placed across the shunt diode 20 to provide a discharge path for the secondary blocking capacitor 16 so that the MOSFET 24 is in the off state at initial power application.

The output of the drive circuit 110 consisting of the pulse width modulator 32, primary blocking capacitor 14, transformer 30, secondary blocking capacitor 16, shunt diode 20, and bleeder resistor 26 is connected between the gate 24.2 and source terminals 24.3 of the P-channel MOSFET 24. The phasing of the transformer 30 is such that a positive going input signal from the modulator IC 32 results in a negative going drive signal to the MOSFET 24.

A power supply decoupling capacitor 12 provides a local low impedance path for current pulsations drawn by the power circuit. An output peak filter capacitor 18 holds the peak DC voltage produced by the flyback power circuit. An output rectifier diode 22 is the output rectifier for the flyback power stage.

Within the isolation circuit 130, a feedback isolator 34 transfers the feedback error signal across the galvanic barrier from the input side 11 to the isolated output side 13 and 15. The reference and error amplifier 36 compares the output signal to a reference voltage and creates an amplified error voltage that will be ultimately transmitted to the pulse width modulator IC 32.

It should be noted that instead of using the drive pulse transformer 30 for polarity inversion and voltage level shifting, a direct coupled transistor inverter circuit can be used to shift levels and invert the FET drive waveform.

Figure 2:
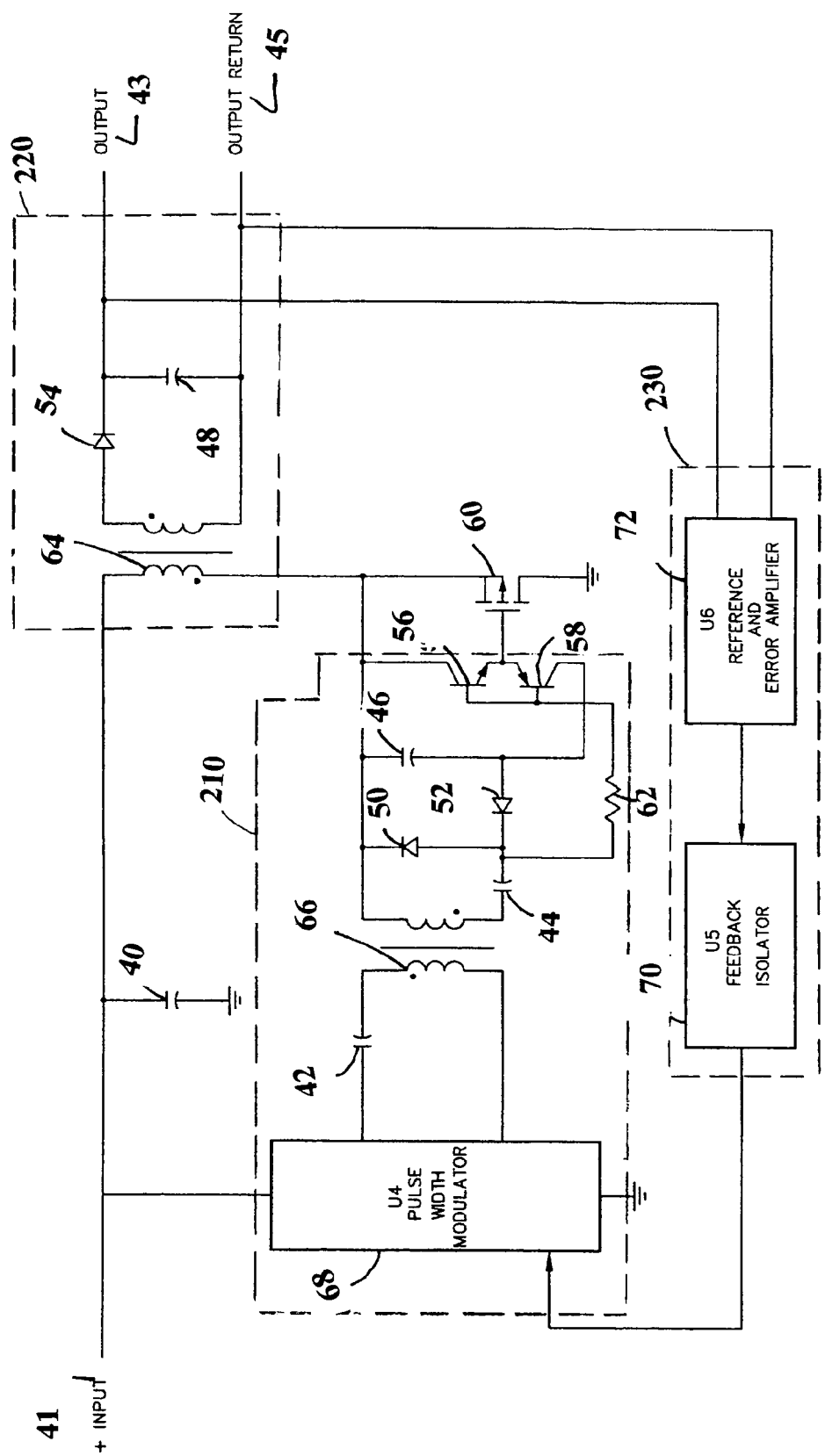
FIG. 2 is a circuit diagram for an exemplary radiation tolerant DC/DC converter according to an alternative embodiment of the present invention.

In an alternative embodiment of the drive circuit, shown in FIG. 2, an input line 41 provides an input signal to a drive circuit 210 that drives an FET 60 to produce an output. The FET output is run through a rectification circuit 220 before being supplied on an output line 43 and output return 45. An isolation circuit 230 isolates the input 41 from the output 43 and 45.

In the drive circuit 210, a secondary blocking capacitor 44, shunt diode 50, series diode 52 and shunt capacitor 46 are driven by a drive pulse transformer 66 secondary forming a standard half wave voltage double circuit. The drive pulse transformer 66 transmits the gate drive signal to the transistors 56 and 58. An NPN 56-PNP 58 buffer is connected to the junction of the blocking capacitor 44 and two diodes 50, 52 through a resistor 62. The resulting drive waveform connected to the gate and source terminals of the P channel FET 60 is essentially devoid of unwanted voltage transients and has a low output impedance which is well suited to drive the capacitance of the gate terminal of the FET 60. An NPN bipolar transistor 56 buffers the gate drive signal for the P-channel enhancement MOSFET 60 and a PNP bipolar transistor 58 buffers the drive gate drive signal. The P channel enhancement MOSFET 60 switches the transistor 64 for the flyback converter. An isolation resistor 62 minimizes the possibility that the transistors 56 and 58 can saturate, which would cause them to switch more slowly.

A power supply decoupling capacitor 40 provides a local low impedance path for current pulsations drawn by the power circuit. A primary blocking capacitor 42 blocks the DC voltage component from appearing across the primary winding of the drive pulse transformer 66. A secondary blocking capacitor 44 blocks the DC voltage from the secondary winding of the drive pulse transformer 66. A DC restorer diode 50 is connected across the drive pulse transformer 66 primary winding. A prevention diode 52 prevents the discharge of the peak filter capacitor 46 when the voltage of the cathode 52 becomes positive with respect to the anode.

A gate output peak filter capacitor 46 holds the peak DC voltage produced by the gate drive signal. A flyback output peak filter capacitor 48 holds the peak DC voltage produced by the flyback power circuit. The main flyback transformer 64 regulates the output line 43 and output return 45. An output rectifier 54 for the flyback power stage is connected to the main flyback transformer 64.

A pulse width modulator IC 68 generates the drive pulses to attain a switching duty cycle in the P-channel MOSFET 60 that produces the desired overall output voltage from the flyback circuit. A feedback isolator 70 transfers the feedback error signal across the galvanic barrier from the input side 41 to the isolated output side 43 and 45. A reference and error amplifier 72 compares the output signal to a reference voltage and creates an amplified error voltage that will be ultimately transmitted to the pulse width modulator IC 68.

This design circuit technique can be extended to employ two or more secondary windings on the drive transformer, each secondary driving a suitable rectification and DC restoration circuit. The output of each drive rectification and DC restoration circuit will be connected between the gate and source of a P channel FET.

In such a configuration, the two or more transformer secondary windings may be used to drive the FETs in an in phase or out of phase arrangement, depending on the desired configuration for the switching FETs.

Although the present invention has been described with reference to DC/DC converters, the same principles outlined above may be used for motor drives, solid state relays and power switches, among other electrical applications.

In the preceding specification, the invention has been described with reference to specific exemplary embodiments thereof. It will however, be evident that various modifications and changes may be made thereto without departing from the broader spirit and scope of the invention as set forth in the claims that follow. The specification and drawings are accordingly to be regarded in an illustrative manner rather than a restrictive sense.

What is claimed is:

1. A radiation tolerant electrical component for providing controlled electrical response in radiation-intensive applications, the component comprising:
    an input line;
    an output line;
    a drive circuit, the drive circuit capable of transmitting a negative gate drive signal;
    a non-hardened p-channel FET having a drain, a gate, and a source, the FET having a negative initial threshold voltage;
    an isolation circuit; and
    an output rectification circuit;
wherein:
    the input line is operably connected to the drive circuit;
    the drive circuit is operably connected to the gate;
    the source and gate are operably connected to the output rectification circuit;
    the output rectification circuit is operably connected to the output line;
    the isolation circuit is operably connected between the output line and the drive circuit to isolate the input line from the output line; and
    the drain is connected near ground,
    whereby, when operating the electrical component in a radiation-intensive environment, the FET should operate at close to its maximum gate voltage signal thereby allowing the FET to function across a high range of radiation exposure, and
    whereby, when operating the electrical component in a radiation-intensive environment, the FET remains controllable even if the FET operates below its maximum gate voltage.

2. The electrical component of claim 1 further comprising a de-coupling capacitor connected between the input line and ground.

3. The electrical component of claim 1 wherein the drive circuit further comprises:
    a pulse width modulator operably connected to the input line;
    a drive pulse transformer having a primary winding and a secondary winding, the primary winding connected to the pulse width modulator, the secondary winding connected to the gate and source.

4. The electrical component of claim 3 further comprising a primary blocking capacitor connected between the pulse width modulator and the primary winding.

5. The electrical component of claim 3 further comprising a secondary blocking capacitor connected between the gate and the secondary winding.

6. The electrical component of claim 3 further comprising a zener diode connected between the secondary winding and the gate.

7. The electrical component of claim 3 further comprising a bleeder resistor connected between the secondary winding and the gate.

8. The electrical component of claim 1 wherein the isolation circuit further comprises a reference and error amplifier connected between the output line and the drive circuit.

9. The electrical component of claim 8 wherein the isolation circuit further comprises a feedback isolator connected between the reference and error amplifier and the drive circuit.

10. The electrical component of claim 1 wherein the output rectification circuit further comprises a main flyback transformer having a flyback primary winding and a flyback secondary winding, the flyback primary winding connected to the input line and the source, the flyback secondary winding connected to the output line.

11. The electrical component of claim 10 wherein the output rectification circuit further comprises a rectifier diode connected between the flyback secondary winding and the output line.

12. The electrical component of claim 10 wherein the output rectification circuit further comprises an output peak filter capacitor connected across the flyback secondary winding.

13. The electrical component of claim 1 wherein the drive circuit further comprises:
    a pulse width modulator operably connected to the input line;
    a drive pulse transformer having a primary winding and a secondary winding;
    an NPN bipolar transistor;
    a PNP bipolar transistor;
wherein:
    the primary winding is operably connected to the pulse width modulator; and,
    the NPN transistor and the PNP transistor are connected in series across the secondary winding, between the secondary winding and the gate.

14. The electrical component of claim 13 further comprising a primary blocking capacitor connected to the primary winding.

15. The electrical component of claim 13 further comprising a secondary blocking capacitor connected to the secondary winding.

16. The electrical component of claim 13 further comprising a DC restorer diode connected across the secondary winding.

17. The electrical component of claim 13 further comprising a prevention diode connected across the secondary winding.

18. The electrical component of claim 13 further comprising an isolation resistor connected between the secondary winding and the NPN and PNP transistors.

19. The electrical component of claim 1 wherein the FET is a p-channel MOSFET.

20. The electrical component of claim 1 wherein the electrical component is a DC/DC converter.

21. The electrical component of claim 1 wherein the electrical component is a power switch.

* * * * *